United States Patent
Demaie et al.

(10) Patent No.: US 7,493,807 B2
(45) Date of Patent: Feb. 24, 2009

(54) TIRE HAVING A DEFORMATION SENSOR, AND METHOD OF EVALUATION OF THE DEFLECTION OF A TIRE

(75) Inventors: Heathcliff Demaie, Clermont-Ferrand (FR); Patrick Gougnaud, Saint Vincent (FR); Mickael Lion, Clermont-Ferrand (FR); Valery Poulbot, Les Martres d'Artieres (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/599,755

(22) PCT Filed: Mar. 24, 2005

(86) PCT No.: PCT/EP2005/003146

§ 371 (c)(1),
(2), (4) Date: Oct. 6, 2006

(87) PCT Pub. No.: WO2005/108123

PCT Pub. Date: Nov. 17, 2005

(65) Prior Publication Data

US 2007/0272006 A1  Nov. 29, 2007

(30) Foreign Application Priority Data

Apr. 9, 2004  (FR) .................................. 04 03814

(51) Int. Cl.
*B60C 23/02* (2006.01)
(52) U.S. Cl. ..................................................... 73/146.5
(58) Field of Classification Search ............... 73/146.5, 73/146; 324/661, 515
See application file for complete search history.

(56) References Cited

U.S. PATENT DOCUMENTS

| | | | |
|---|---|---|---|
| 5,974,856 A * | 11/1999 | Elie et al. | 73/11.04 |
| 6,543,279 B1 * | 4/2003 | Yones et al. | 73/146.5 |
| 6,597,980 B2 * | 7/2003 | Kogure | 701/80 |
| 6,606,911 B2 * | 8/2003 | Akiyama et al. | 73/718 |
| 6,958,615 B2 | 10/2005 | Poulbot et al. | |
| 7,069,135 B2 | 6/2006 | Bertrand | |
| 2003/0056579 A1 | 3/2003 | Poulbot et al. | |

(Continued)

FOREIGN PATENT DOCUMENTS

EP  0 937 615 A2  8/1999

(Continued)

OTHER PUBLICATIONS

International Search Report for Application No. PCT/EP2005/003146 date of completion of the search Jun. 21, 2005.

*Primary Examiner*—Andre J Allen
(74) *Attorney, Agent, or Firm*—Fitzpatrick, Cella, Harper & Scinto

(57) ABSTRACT

The invention concerns a tire provided with a capacitative sensor including two substantially parallel electrodes, the sensor being carried by a sidewall of the tire. The electrodes of the sensor lie substantially in a plane perpendicular to the rotation axis of the tire and are substantially orientated in an ortho-radial direction. The invention also concerns a tire provided with a deformation sensor, a method for evaluating the deflection of a tire, and a deformation sensor.

17 Claims, 2 Drawing Sheets

U.S. PATENT DOCUMENTS

2004/0004486 A1 1/2004 Poulbot et al.
2005/0065699 A1 3/2005 Bertrand

FOREIGN PATENT DOCUMENTS

| | | | |
|---|---|---|---|
| EP | 1 186 853 | A2 | 3/2002 |
| FR | 2 835 919 | A1 | 8/2003 |
| WO | 02057711 | A1 | 7/2002 |

* cited by examiner

TIRE HAVING A DEFORMATION SENSOR, AND METHOD OF EVALUATION OF THE DEFLECTION OF A TIRE

BACKGROUND OF THE INVENTION

1. Field of the Invention

The invention concerns a tire provided with a capacitative sensor, a tire provided with a deformation sensor, a deformation sensor and a method for evaluating the deflection of a tire. More precisely, the invention concerns a tire provided with a capacitative sensor comprising two substantially parallel electrodes, the capacitative sensor being carried by a sidewall of the tire.

2. Related Art

"Deflection of a tire" means the amplitude of the vertical deformation of the tire under load. Measurement of the deflection allows determination of the approximate load on the tire at a given inflation pressure. The load on a tire is an important parameter, because exceeding the maximum recommended load can adversely affect the endurance of the tire. In the case of large tires, for example tires fitted on heavy vehicles or construction machinery, the maximum load for which the tire is designed is generally used to indicate loading limits.

During a rolling phase, the tire is subjected to forces in three directions:

- a vertical or radial force under the effect of the load imposed by the vehicle,
- a horizontal force orientated along the rolling direction, also called the ortho-radial shear force, produced by a torque applied to the tire, for example due to the acceleration of the vehicle, and
- a horizontal force perpendicular to the rolling direction, also called the axial shear force, produced by making the tire drift, for example when the vehicle is rounding a bend.

At a given point of the tire the ortho-radial direction is the direction perpendicular to the axis and to a radius passing through the point.

From the prior art, in particular from U.S. Pat. No. 6,958,615 (counterpart to WO 02/057711), which is hereby incorporated by reference, a tire is already known which is provided with a capacitative sensor comprising two substantially parallel electrodes arranged radially on a sidewall of the tire. The capacitance value of such a sensor varies as a function of the distance between the two electrodes. Consequently, by fixing such a sensor on a sidewall of the tire, the signal furnished by the sensor is a function of the deformations of the sidewalls of the tire.

The sensor of the prior art is equally sensitive to the three above forces to which the tire is subjected. In effect, the variations of the signal furnished by the sensor due to each of the three forces are of the same order of magnitude.

Thus, the signal depends on the elementary contributions of each force. Current methods then enable the circumferential extension of the tire to be determined, for which the values of the forces on the tire and of its deflection are deduced empirically, in particular by neural networks.

These methods give satisfactory results, but they are complicated to put into practice. Thus, in applications in which only a measurement of the deflection of the tire is needed, the known methods are not appropriate.

Patent application EP 1186853 relates to an arrangement that measures the sidewall deformations by means of sensors external to the tire. Two magnitudes seem accessible from such an arrangement: the deradialisation of the carcass cords that reinforce the sidewalls of a tire, and the distance between the sensors and the sidewall. No application to measurement of the deflection is mentioned in the document, and in the objective section, no precise limitation is given concerning the position of these external sensors.

The purpose of the present invention is to overcome these drawbacks by providing a tire with a capacitative sensor which enables the deflection of the tire to be measured in a simple way.

SUMMARY OF THE INVENTION

One object of the invention is to provide a tire having a capacitative sensor comprising two substantially parallel electrodes, the capacitative sensor being carried by a sidewall of the tire, characterized in that the electrodes of the sensor are located substantially in a plane perpendicular to the rotation axis of the tire and are substantially orientated in an ortho-radial direction.

The inventors have found, first, that the signal furnished by a capacitative sensor of a tire according to the invention is much more sensitive to sidewall deformations produced by a vertical force on the tire than to sidewall deformations produced by a horizontal force on the tire. The inventors combined this with the fact that the sidewall deformations produced by a vertical force on the tire are directly related to its deflection, to arrive at the conclusion that for a given angular position of the sensor, there is a bijection between the range of values furnished by the sensor and the range of values adopted by the deflection.

In other words, the tire according to the invention furnishes a signal which indicates the deflection directly, i.e., without calculation.

A tire provided with a capacitative sensor according to the invention can also have one or more of the following characteristics:

- the sensor's electrodes may be filamentary electrodes;
- the electrodes may be filaments of conductive rubber, flexible in bending and in tension, so that the mechanical function of the tire is not interfered with;
- the electrodes may be strip electrodes;
- the electrodes may be rectilinear;
- the electrodes may be circular arcs substantially concentric with the rotation axis of the tire;
- the two electrodes may be embedded in an elastomeric body forming a dielectric, the sensor being configured so as to facilitate displacements of one electrode relative to the other;
- the elastomeric body may have a slot between the two electrodes;
- the sensor may be provided with a flexible conductive envelope connected to a fixed potential, designed to limit electromagnetic interference; and
- the conductive envelope may comprise conductive particles embedded in the elastomeric body, these conductive particles being, for example, carbon black or metallic particles.

Three zones on the sidewall of the tire are distinguished: a bottom zone corresponding to the radially innermost part of the sidewall, in which the rubber is very rigid, a zone of maximum flexure, which undergoes the most local bending when the tire is under load, and an intermediate zone. The zone of maximum flexure is near the equator of the tire, i.e., the place where the tire is widest.

The intermediate zone of the sidewall of the tire also bends when the tire is subjected to a load. The inventors of the present invention found, however, that the local deformation of that zone measured by a capacitative sensor according to the invention is even less sensitive to horizontal forces than the local deformation measured at other zones of the sidewalls of the tire.

It is therefore advantageous for the capacitative sensor to be located on a part of the sidewall of the tire between a bottom zone and a zone of maximum flexure.

Another object of the invention is to provide a tire having a deformation sensor, characterized in that the sensor is arranged to furnish a value characteristic of the local bending of part of the sidewall of the tire in a plane containing the axis of the tire.

"Local bending" of part of the sidewall of the tire means the variation in the curvature of that part of the sidewall of the tire. The local bending is a local measurement that depends on the part of the sidewall in question, in contrast to the deflection, which is an overall measurement relating to the tire and the forces to which it is subjected.

"Value characteristic" of the local bending means a value furnished by the senor at a given moment, to which there corresponds one and only one curvature of the part of the sidewall of the tire concerned. There is therefore a bijection between the range of instantaneous values furnished by the sensor and the range of curvatures adopted by the part of the sidewall of the tire concerned.

There is also a bijection between the range of curvatures adopted by the part of the sidewall of the tire and the range of values adopted by the deflection of the tire.

Consequently, the existence of these two bijections shows that a tire provided with a deformation sensor according to the invention enables the value of the deflection of the tire to be obtained in a simple and direct manner.

Owing to the geometry and positioning of its electrodes, a capacitative sensor positioned on the sidewall of a tire according to the first object of the invention, as defined above, satisfies the definition of a sensor arranged to furnish a value characteristic of the local bending of part of the sidewall of the tire in a plane containing the axis of the tire.

A tire provided with a deformation sensor according to the invention can also have one or more of the following characteristics:
 the sensor may be located on the part of the sidewall of the tire so that the sensor furnishes a value characteristic of the local bending;
 the part of the sidewall of the tire where the sensor furnishes a value characteristic of the local bending may be located between a bottom zone and a zone of maximum flexure.

A further object of the invention is a deformation sensor comprising two substantially parallel electrodes embedded in an elastomeric body which forms a dielectric, characterized in that it is configured so as to facilitate the displacement of one of the electrodes relative to the other, thus allowing better sensitivity to bending.

A deformation sensor according to the invention can also have one or more of the following characteristics:
 the configuration for facilitating displacement of one of the electrodes relative to the other may comprise a slot between the two electrodes in the elastomeric body;
 the deformation sensor may be provided with a flexible conductive envelope connected to a fixed potential and designed to limit electromagnetic interference; and
 the conductive envelope may comprise conductive particles embedded in the elastomeric body, these conductive particles being for example carbon black or metallic particles.

A further object of the invention is a method for evaluating the deflection of a tire, comprising a step in which the local bending of part of the sidewall of the tire is measured, in a plane containing the axis of the tire.

A method for evaluating the deflection of a tire according to the invention may also be characterized in that the part of the sidewall of the tire where the local bending is measured may be located between a bottom zone and a zone of maximum flexure.

According to a particular embodiment, a method for evaluating the deflection of a tire according to the invention comprises a step in which the pressure of the tire is measured. Measurement of the pressure enables the precision to be improved when evaluating the deflection.

BRIEF DESCRIPTION OF THE DRAWINGS

The invention will be better understood on reading the description below, which is given only as an example and which refers to the attached drawings in which.

DETAILED DESCRIPTION OF THE INVENTION

Figure 1:
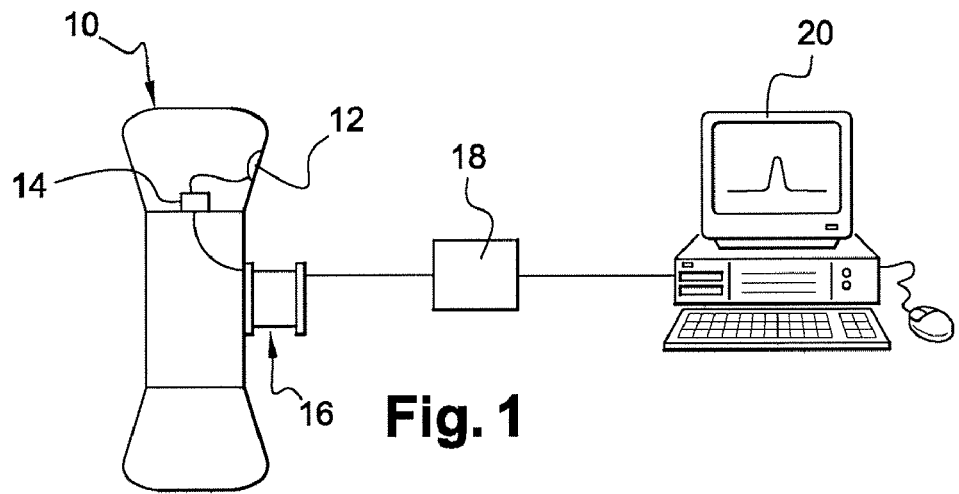
FIG. 1 is a schematic representation of a tire provided with a deformation sensor.

A rubber tire designated by reference number 10, provided with a device that enables the deflection to be measured, is represented in FIG. 1. The tire is a vehicle tire, but the invention can be applied to any type of tire.

The part of the tire intended to be in contact with a road during normal use of the tire is called the tread. The deflection of a tire is the amplitude of its vertical deformation when subjected to a load.

This deflection measurement device comprises a deformation sensor 12 arranged on the sidewall of the tire, a measurement box 14 that receives information from the deformation sensor 12, and a rotary collector 16 which enables that information to be transmitted to a receiving box 18 connected to a processor device 20 which provides measurement of the deflection as a function of the data received. The processor device 20 may be, for example, a computer.

The deformation sensor can be arranged at any point on the sidewall, either on the inside sidewall or on the outside sidewall of the tire.

Figure 2:
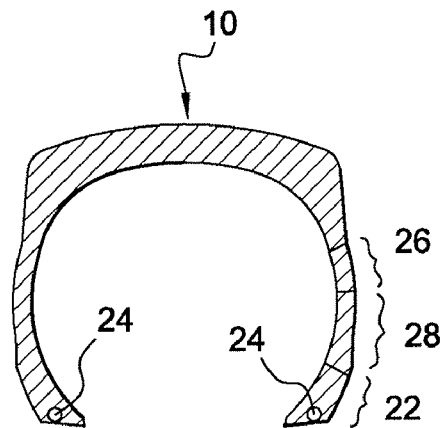
FIG. 2 is a schematic view of a radial section of an unloaded tire.
Figure 3:
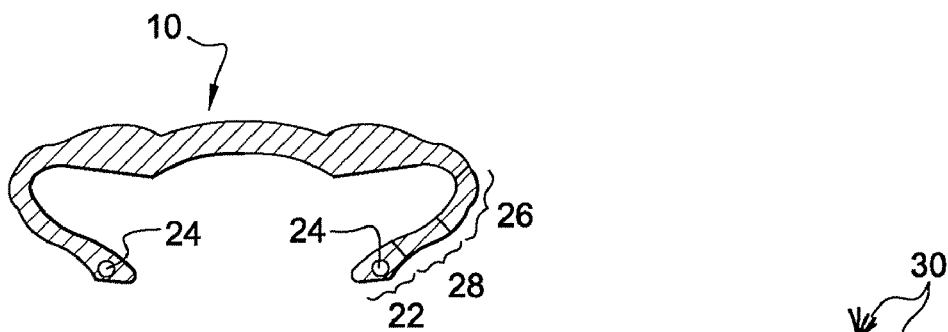
FIG. 3 is a schematic view of a radial section of a tire under load.
Figure 4:
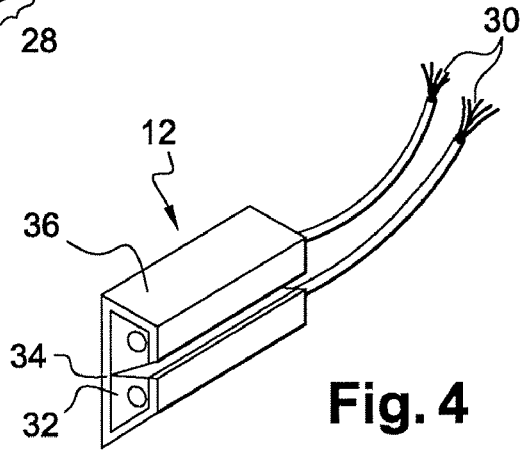
FIG. 4 is a schematic perspective view of a bifilamentary sensor.

The sidewall of the tire 10 can be divided into three zones as represented in FIGS. 2 and 3.

A first zone, said to be the bottom zone 22 of the tire 10, is located at the innermost part of the sidewall. This bottom zone, which generally comprises a very rigid rubber, contains steel bead-wires 24 whose function is to ensure the mechanical stability of the tire.

A second zone, called the zone of maximum flexure 26, is located approximately at the tire's equator, i.e., at the place where it is widest. It is in this zone that the bending of the sidewall of the tire 10 is maximum when it is subjected to a load, as shown in FIG. 3.

Finally, there is a third zone called the intermediate zone 28, located between the zone of maximum flexure 26 and the bottom zone 22 of the sidewall of the tire. This intermediate zone 28 has the advantage of being more flexible and thus undergoing larger deformations than the bottom zone 22 of the sidewall of the tire 10, but is less sensitive to forces due to acceleration and bends than the zone of maximum flexure 26 of the sidewall.

It is therefore advantageous for the deformation sensor 12 to be arranged so as to measure the local bending of that intermediate zone 28 in a plane containing the axis of the tire 10.

The deformation sensor used, which will be described later, is small enough to fit entirely within the intermediate zone of the sidewall.

The zone of the tread of the tire that is in contact with the road at a given instant is called the contact area.

When the tire is subjected to a vertical load, its sidewalls, which connect the contact area of the tread to the centre of the tire, bend. This is referred to as the "rabbit's belly". The rabbit's belly zone is the part of the sidewall of the tire which bends. This rabbit's belly zone extends over an angular sector measuring approximately 60°.

When the tire fitted with a deformation sensor is rotating, the sensor, located on the intermediate zone of the tire, describes substantially a vertical circle. In particular the sensor passes through two characteristic points: the top and the lowest point of this circular path.

Bending is maximum when the sensor is at the lowest point in its path, i.e., when it is located in the middle of the rabbit's belly zone.

Along the remainder of the path, the part of the sidewall of the tire on which the sensor is located is substantially at rest. The sidewall of the tire is at rest along an angular sector measuring approximately 300°.

During a rotation of the tire, the value of the local bending of the sidewall of the tire changes continuously between the two extreme values. It increases when the sensor is moving between entering the rabbit's belly zone and the middle of that zone, and decreases between the middle of the rabbit's belly zone and its emergence from that zone.

Figure 7:
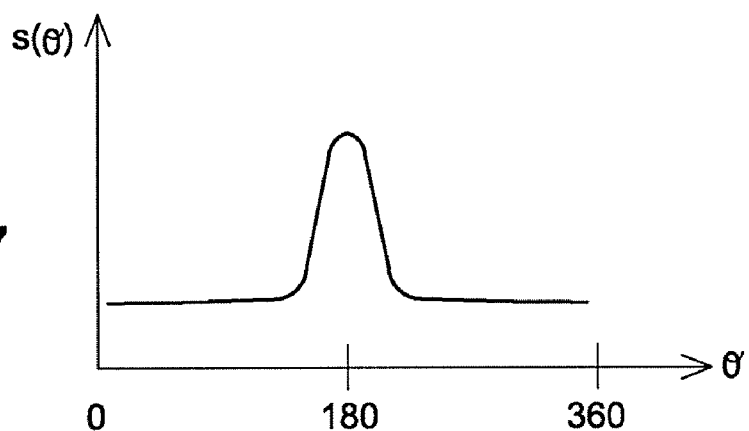
FIG. 7 is a graph representing the signal furnished by the bifilamentary sensor during a revolution of a tire provided with the sensor.

The signal $s(\theta)$ furnished by the deformation sensor 12 during the rotation of the tire 10 is thus a periodic signal of period 360°. This signal is represented as a function of the angle of rotation $\theta$ of the tire in FIG. 7.

In this periodic signal the point of particular interest is a signal value $S(\theta_0)$, where $\theta_0$ is a constant angle between 0° and 360°, for example a signal value when the sensor is at the middle of the rabbit's belly zone. That value corresponds in principle to the maximum local bending of the sidewall of the tire.

As already explained, the inventors found that the value of the maximum local bending is related directly to the deflection of the tire. Thus, a measurement of the maximum local bending enables the value of the deflection to be obtained. To improve the precision of the deflection it is advantageous to take the pressure of the tire into account.

The relationship between these three data can be obtained by means of a neural network, or more simply from a table of values filled in empirically.

Under normal conditions of use the tire is not rolling on a perfectly flat road and the maximum local bending is not always obtained when the sensor is in the middle of the contact area. The results can therefore be averaged using the local bending measurements for several rotation angle values, or the value of the integral of the periodic signal over a period can be used.

The deformation sensor 12 used is a capacitative sensor comprising two parallel filamentary electrodes. This is called a bifilamentary sensor. The bifilamentary sensor comprises two parallel, flexible conductive filaments 30 embedded in an elastomeric body 32 forming a dielectric. The sensor acts as a condenser whose capacitance varies as a function of the separation of the two filaments 30. When the sensor 12 undergoes deformations, the separation between the two filaments varies and so, therefore, does the signal it furnishes.

The conductive filaments are flexible in bending so as not to interfere with the mechanical function of the tire and not to have any adverse effect on its endurance.

The bifilamentary sensor is connected to the measurement box 14 by screened leads so that variation of the distance between the leads does not modify the value of the sensor's capacitance measured by the measurement box 14.

To improve the sensitivity of the bifilamentary sensor to deformations, it comprises a slot 34 in the elastomeric body located between the two filaments 30, parallel to each of them. This slot facilitates the displacement of one filament relative to the other.

The sensor 12 is used to measure the local bending of the sidewall of the tire 10 in a plane containing the axis of the tire 10. The tire's sensor 12 is therefore arranged projecting from the tire 10 in such a manner that the filaments 30 of the sensor lie substantially in a plane perpendicular to the axis of the tire and are substantially orientated along an ortho-radial direction.

Figure 5:
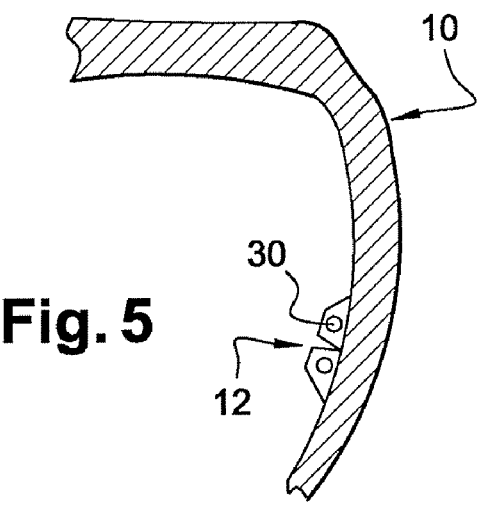
FIG. 5 is a schematic sectional view of a tire provided with a bifilamentary sensor.
Figure 6:
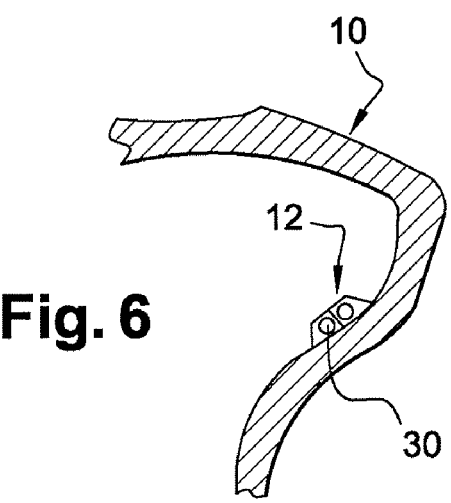
FIG. 6 is a schematic sectional view of a tire under load provided with a bifilamentary sensor.

Thus, when the part of the sidewall of the tire on which the sensor 12 is located is at rest, as shown in FIG. 5, the bifilamentary sensor too is at rest and the two filaments 30 are a certain distance apart. When the part of the sidewall of the tire on which the sensor is located is under load, as shown in FIG. 6, its deformation brings the two filaments 30 of the bifilamentary sensor 12 closer together. It is then found that the slot 34 in the elastomeric body 32 of the bifilamentary sensor 12 is narrower. During the rotation of the tire 10, the bifilamentary sensor 12 therefore changes periodically between a bent position and a rest position.

The deformation sensor can also be provided with a flexible conductive envelope 36 connected to a fixed potential in order to attenuate electromagnetic interferences. In particular, conductive particles can be embedded in the rubber of the tire to form this conductive envelope. These particles can be for example carbon black, or metallic particles.

Figure 8:
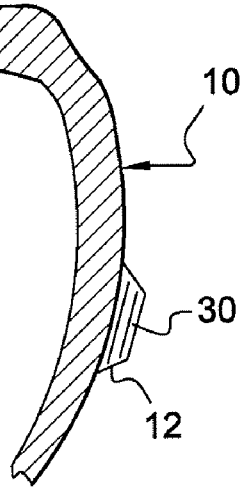
FIG. 8 is a schematic sectional view of a tire provided with a deformation sensor according to another embodiment.

According to a variant illustrated in FIG. 8, the bifilamentary sensor 12 is arranged projecting from the sidewall of the tire 10 in such a manner that the filaments 30 of the sensor lie substantially in a plane containing the axis of the tire and are substantially orientated along a radial direction. For the bifilamentary sensor to be sensitive only to bending of the sidewall of the tire in a plane containing the axis of the tire, it is indispensable that the filaments must project. Thus, when the sidewall of the tire bends, the sensor is stretched and the two filaments move closer together. Since the sensor projects from the tire, shear forces in the rubber of the tire have no effect on the distance between the two filaments, and the sensor is therefore mainly sensitive to bending.

Of course, any slight deviation of the shape and orientation of the filaments of the bifilamentary sensor, for example due to manufacturing tolerances, is acceptable.

The invention is not limited to the embodiments described above. For example, the sensor can be associated with an electronic circuit carried by the tire, which can carry out on-board processing. By virtue of the electronic circuit, the sensor can operate automatically, so that it is no longer necessary to have the rotary collector, the receiving box or the processor device, as described above. The electronic circuit comprises, for example, means for the storage of measurements and means for transmitting the stored measurement to a computer of the vehicle.

What is claimed is:

1. A tire provided with a capacitative sensor comprising at least a pair of substantially parallel electrodes, the capacitative sensor being located on a sidewall of the tire, wherein the electrodes lie substantially in a plane perpendicular to the rotation axis of the tire and are substantially orientated in an ortho-radial direction.

2. The tire of claim 1, wherein the electrodes are filamentary electrodes.

3. The tire of claim 2, wherein the electrodes are filaments of conductive rubber.

4. The tire of claim 1, wherein the electrodes are strip electrodes.

5. The tire of claim 1, wherein the electrodes are rectilinear.

6. The tire of claim 1, wherein the electrodes are arcs of circles substantially concentric with the rotation axis of the tire.

7. The tire of claim 1, wherein the electrodes are embedded in an elastomeric body configured so as to facilitate displacement of one of the electrodes relative to the other.

8. The tire of claim 7, wherein the elastomeric body comprises a slot between the electrodes.

9. The tire of claim 1, wherein the sensor comprises a flexible conductive envelope connected to a fixed potential so as to limit electromagnetic interference.

10. The tire of claim 9, wherein the conductive envelope comprises conductive particles embedded in the elastomeric body, the conductive particles comprising at least one of carbon black and metallic particles.

11. The tire of claim 1, wherein the sensor is located on a part of the sidewall of the tire between a bottom zone and a zone of maximum flexure.

12. A deformation sensor comprising at least a pair of substantially parallel electrodes embedded in an elastomeric body forming a dielectric, wherein the sensor is adapted to be placed on a surface of a tire and is configured to facilitate displacement of one of the electrodes relative to the other and comprises a flexible conductive envelope connected to a fixed potential so as to limit electromagnetic interference.

13. The deformation sensor of claim 12, wherein the conductive envelope comprises conductive particles embedded in the elastomeric body, the conductive particles comprising at least one of carbon black and metallic particles.

14. The deformation sensor of claim 12, wherein the elastomeric body has a slot between the electrodes.

15. A method for evaluating the deflection of a tire, wherein the local bending of part of the sidewall of the tire in a plane containing the axis of the tire is measured with the deformation sensor according to claim 12, 13 or 14.

16. The method for evaluating the deflection of claim 15, wherein the part of the sidewall of the tire where local bending is measured is located between a bottom zone and a zone of maximum flexure.

17. The method for evaluating the deflection of a tire of claim 15, wherein the pressure of the tire is also measured.

* * * * *